United States Patent
Chen et al.

(10) Patent No.: US 9,651,959 B2
(45) Date of Patent: May 16, 2017

(54) SINGLE-INDUCTOR DUAL-OUTPUT (SIDO) POWER CONVERTER FOR HYSTERESIS CURRENT CONTROL MODE AND CONTROL METHOD THEREOF

(71) Applicant: ANPEC ELECTRONICS CORPORATION, Hsinchu (TW)

(72) Inventors: Chih-Yuan Chen, Hsinchu (TW); Tzu-Yang Yen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 14/922,059

(22) Filed: Oct. 23, 2015

(65) Prior Publication Data

US 2017/0023959 A1    Jan. 26, 2017

(30) Foreign Application Priority Data

Jul. 22, 2015   (TW) .............................. 104123713 A

(51) Int. Cl.
| | |
|---|---|
| H02M 1/00 | (2006.01) |
| H02M 3/156 | (2006.01) |
| G05F 1/569 | (2006.01) |
| G05F 1/577 | (2006.01) |
| G05F 1/56 | (2006.01) |

(52) U.S. Cl.
CPC ................ *G05F 1/56* (2013.01); *G05F 1/569* (2013.01); *G05F 1/577* (2013.01); *H02M 3/156* (2013.01); *H02M 2001/008* (2013.01)

(58) Field of Classification Search
CPC ........... H02M 2001/008; H02M 3/156; H02M 3/158; H02M 3/1582; G05F 1/46; G05F 1/56; G05F 1/563; G05F 1/569; G05F 1/577
See application file for complete search history.

(56) References Cited

U.S. PATENT DOCUMENTS

| | | | | |
|---|---|---|---|---|
| 2007/0075689 A1* | 4/2007 | Kinder | ................ | H02M 3/1582 323/259 |
| 2009/0039711 A1* | 2/2009 | Williams | ............ | H02M 3/1584 307/113 |
| 2009/0322303 A1* | 12/2009 | Hirata | ................... | H02M 3/156 323/284 |

(Continued)

OTHER PUBLICATIONS

Kwon et al., Single-Inductor-Multiple-Output Switching DC-DC Converters, Aug. 2009, IEEE Transactions on Circuits and Systems, vol. 56, No. 8., pp. 614-618.*

*Primary Examiner* — Jessica Han
*Assistant Examiner* — David A. Singh
(74) *Attorney, Agent, or Firm* — Li & Cai Intellectual Property (USA) Office

(57) ABSTRACT

The present disclosure illustrates a single-inductor dual-output (SIDO) power converter for hysteresis current control mode and a control method thereof. In the SIDO power converter provided by the instant disclosure, a detecting circuit, connected to the upper bridge transistor, determines whether the inductive current reaches the upper limit threshold or the lower limit threshold, and further drives a control circuit to turn on or off the corresponding upper bridge transistor and/or the lower bridge transistor, so as to simplify the operation of the hysteresis current control mode.

14 Claims, 6 Drawing Sheets

(56) References Cited

U.S. PATENT DOCUMENTS

| | | | |
|---|---|---|---|
| 2010/0002473 A1* | 1/2010 | Williams | H02M 3/158 363/21.06 |
| 2010/0026267 A1* | 2/2010 | Easwaran | H02M 3/158 323/288 |
| 2011/0089917 A1* | 4/2011 | Chen | H02M 3/1584 323/282 |
| 2012/0043947 A1* | 2/2012 | Wilson | H02M 3/1582 323/234 |
| 2012/0062032 A1* | 3/2012 | Sauer | H02M 3/44 307/43 |
| 2014/0218117 A1* | 8/2014 | Branca | H02M 3/156 330/297 |
| 2014/0239720 A1* | 8/2014 | Liu | H02M 3/1582 307/31 |
| 2015/0008742 A1* | 1/2015 | Huang | H02M 3/158 307/31 |

* cited by examiner

SINGLE-INDUCTOR DUAL-OUTPUT (SIDO) POWER CONVERTER FOR HYSTERESIS CURRENT CONTROL MODE AND CONTROL METHOD THEREOF

BACKGROUND OF THE INVENTION

1. Field of the Invention

The instant disclosure relates to a Single-Inductor Dual-Output power converter; in particular, to a Single-Inductor Dual-Output power converter used in the hysteresis current control mode and a control method thereof.

2. Description of Related Art

With the development of the electronics industry, the power converter has taken an important role for stabilizing the voltage of load and extending the battery life time. Moreover, because the microminiaturization of the wafer processing and the lowering of the core voltage, the voltage precision of power converter has become a strict requirement. Thus, the power converter for the hysteresis current control mode with quick transient response has become valuable. In short, the hysteresis current control mode is a switching control mode to control the inductive current to be within the predetermined upper limit threshold and the lower limit threshold. For example, when the inductive current is lower than the lower limit threshold, the power converter turns on the power switch to increase the inductive current, and when the inductive current reaches the upper limit threshold, the power converter turns off the power switch to decrease the inductive current to the lower limit threshold. Therefore, the above switching control has advantages, such as easy design, quick response needing no slope compensation, wherein its operation mode has no constant frequency.

In addition, recently, the electronic devices have become multi-functional. Thus, to effectively satisfy the power requirements of different functional elements, it has become necessary to have a power converter able to provide different voltages, wherein the single-inductor dual-output power converter is a suitable option. The single-inductor dual-output power converter can provide the boost mechanism and the buck-boost mechanism with one inductor, which saves volume, lowering the cost and increasing the converting efficiency. However, when the above inductor is used under both mechanisms, the inductive currents would be different in different loading conditions, which makes it hard to set the upper limit threshold and the lower limit threshold of the inductive current of the power switch in different loading conditions, and further makes it hard to control the turning on or off of the power switch.

SUMMARY OF THE INVENTION

The instant disclosure provides a Single-Inductor Dual-Output (SIDO) power converter used in a Hysteresis Current Control Mode. The SIDO power converter comprises an upper bridge transistor, a lower bridge transistor, an inductor, an error amplifying circuit, a detecting circuit and a control circuit. The upper bridge transistor is connected between a first output end and an input voltage. The lower bridge transistor is connected between a second output end and a grounding voltage. The inductor is connected between the first output end and the second output end. The error amplifying circuit is connected to the first output end and the second output end. The error amplifying circuit is configured to receive a first output voltage and a second output voltage, and to respectively compare the received first output voltage and the received second output voltage with a first reference voltage and a second reference voltage, so as to generate a first loading signal and a second loading signal. The detecting circuit is connected to the upper bridge transistor. The detecting circuit is configured to receive a detecting value and to compare the detecting value respectively with an upper limit threshold and a lower limit threshold, so as to generate a first control signal and a second control signal. The control circuit is connected to the error amplifying circuit and the detecting circuit. The control circuit is configured to receive the first loading signal, the second loading signal, the first control signal and the second control signal, and to respectively control the tuning on or off of the upper bridge transistor and the lower bridge transistor, according to the received first loading signal, the received second loading signal, the received first control signal and the received second control signal.

The instant disclosure further provides a method to control a Single-Inductor Dual-Output (SIDO) power converter used in a Hysteresis Current Control Mode. The SIDO power converter comprises an upper bridge transistor connected between a first output end and an input voltage, a lower bridge transistor connected between a second output end and a grounding voltage, an inductor connected between the first output end and the second output end, an error amplifying circuit connected to the first output end and the second output end, a detecting circuit connected to the upper bridge transistor, and a control circuit connected to the error amplifying circuit and the detecting circuit. The method comprising: via the error amplifying circuit, receiving a first output voltage and a second output voltage and respectively comparing the received first output voltage and the received second output voltage with a first reference voltage and a second reference voltage, so as to generate a first loading signal and a second loading signal; via the detecting circuit, receiving a detecting value and comparing the detecting value respectively with an upper limit threshold and a lower limit threshold, so as to generate a first control signal and a second control signal; and via the control circuit, receiving the first loading signal, the second loading signal, the first control signal and the second control signal, and respectively controlling the tuning on or off of the upper bridge transistor and the lower bridge transistor according to the received first loading signal, the received second loading signal, the received first control signal and the received second control signal.

To sum up, in the SIDO power converter used in the hysteresis current control mode and the control method thereof provided by the instant disclosure, the detecting circuit, connected to the upper bridge transistor, determines whether the inductive current reaches the upper limit threshold or the lower limit threshold, and further drives the control circuit to turn on or off the corresponding upper bridge transistor and/or the lower bridge transistor, so as to simplify the operation of the hysteresis current control mode.

For further understanding of the instant disclosure, reference is made to the following detailed description illustrating the embodiments and embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Figure 1:
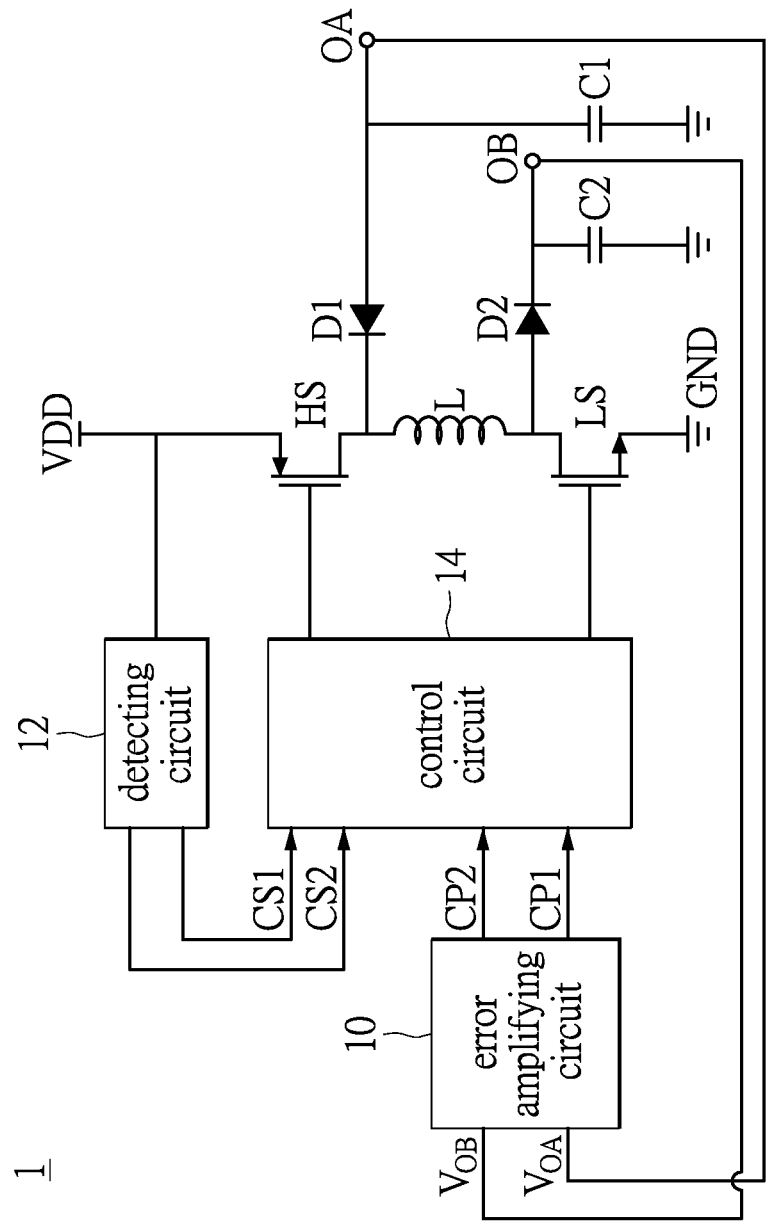
FIG. 1 shows a block diagram of a SIDO power converter used in the hysteresis current control mode of one embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below and could be termed a second element, component, region, layer or section without departing from the teachings of the instant disclosure. As used herein, the term "and/or" includes any and all combinations of one or more of the associated listed items.

Please refer to FIG. 1. FIG. 1 shows a block diagram of a SIDO power converter used in the hysteresis current control mode of one embodiment of the instant disclosure. The single-inductor dual-output (SIDO) power converter 1 comprises an upper bridge transistor HS, a lower bridge transistor LS, an inductor L, an error amplifying circuit 10, a detecting circuit 12 and control circuit 14. The error amplifying circuit 10, the detecting circuit 12 and the control circuit 14 of the SIDO power converter 1 can be implemented entirely by hardware circuits, or by the hardware circuit with firmware or software, and it is not limited herein. Moreover, the error amplifying circuit 10, the detecting circuit 12 and the control circuit 14 can be integrated or separated, and it is also not limited herein.

Specifically speaking, the upper bridge transistor HS is connected between the first output end OA and the input voltage VDD, and the lower bridge transistor LS is connected between the second output end OB and the grounding voltage GND. The inductor L is connected between the first output end OA and the second output end OB. Thus, the SIDO power converter 1 can respectively output a first output voltage VOA and a second output voltage VOB via the first output end OA and the second output end OB. It is worth mentioning that the designed structure of the upper bridge transistor HS, the lower bridge transistor LS and the inductor L is well-known to those skilled in the art, so the details related to the designed structure of the upper bridge transistor HS, the lower bridge transistor LS and the inductor L are omitted herein. The embodiment shown in FIG. 1 is one of implementations of the SIDO power converter comprising the upper bridge transistor HS, the lower bridge transistor LS and the inductor L, but it is not limited herein, and those skilled in the art can design it depending on need.

Please refer to FIG. 1. In practice, the upper bridge transistor HS can be a P-channel MOSFET (PMOS), the lower bridge transistor LS can be an N-channel MOSFET (NMOS), and the inductor L is connected between the drain of the upper bridge transistor HS and the drain of the lower bridge transistor LS. Moreover, the SIDO power converter 1 can further comprise a first diode D1, a second diode D2, a first output capacitor C1 and a second output capacitor C2. As shown in FIG. 1, the first diode D1 is connected between the drain of the upper bridge transistor HS and the first output end OA, and the second diode D2 is connected between the drain of the lower bridge transistor LS and the second output end OB. The first output capacitor C1 is connected between the first output end OA and the grounding voltage GND, and the second output capacitor C2 is connected between the second output end and the grounding voltage GND. Thus, from the above, those skilled in the art should understand that, the SIDO power converter in this embodiment can be operated in one of the buck-boost operation mode, the boost operation mode and the inversing buck-boost operation mode.

The error amplifying circuit 10 is connected to the first output end OA and the second output end OB, and respectively compares the received first output voltage VOA and the received second output voltage VOB with a first reference voltage Vref1 and a second reference voltage Vref2, so as to generate a first loading signal CP1 and a second loading signal CP2. In addition, the detecting circuit 12 is connected to the upper bridge transistor HS, and compares a received detecting value related to the inductive current with the upper limit threshold and the lower limit threshold to generate a first control signal CS1 and the second control signal CS2. The control circuit 14 is connected to the error amplifying circuit 10 and the detecting circuit 12, and respectively controls the turning on or off of the upper bridge transistor HS and the lower bridge transistor LS according to the received first loading signal CP1, the second loading signal CP2, the first control signal CS1 and the second control signal CS2.

Figure 2:
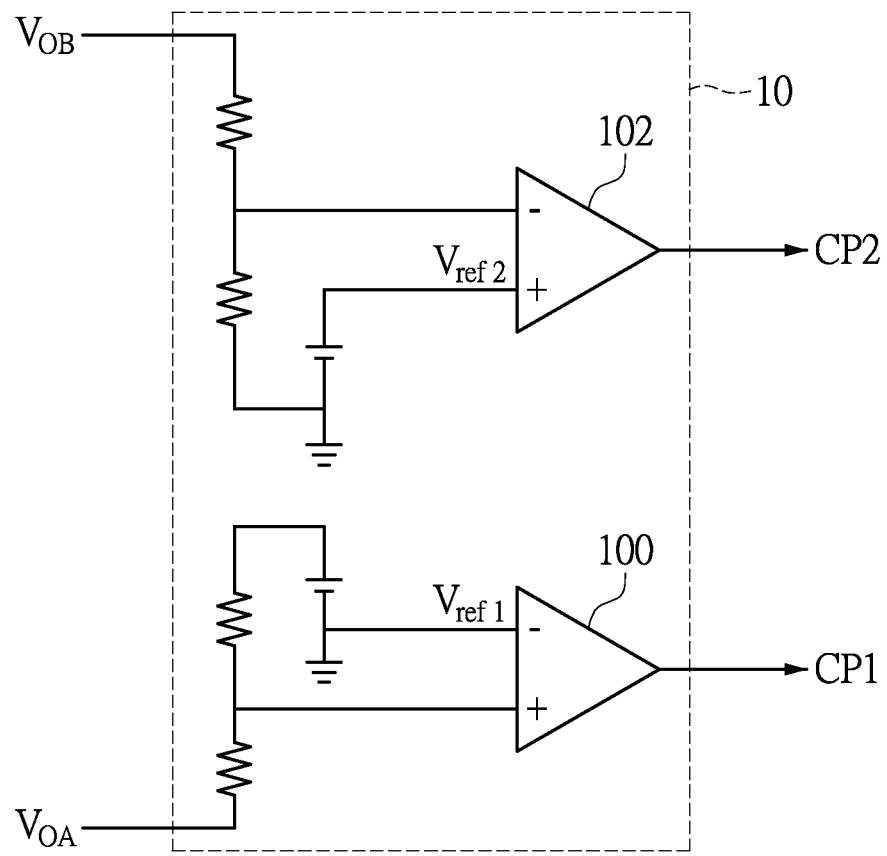
FIG. 2 shows a circuit diagram of a SIDO power converter used in the hysteresis current control mode of one embodiment of the instant disclosure.

In order to further illustrate the details of the error amplifying circuit 10 in the SIDO power converter 1, an embodiment of the error amplifying circuit 10 is provided herein. Please refer to FIG. 2. FIG. 2 shows a circuit diagram of a SIDO power converter used in the hysteresis current control mode of one embodiment of the instant disclosure. The embodiment shown in FIG. 2 is one of implementations of the error amplifying circuit 10 of the SIDO power converter 1, and it is not limited herein. Additionally, the error amplifying circuit 10 in this embodiment can be used in the SIDO converter 1 shown in FIG. 1, and thus please refer to FIG. 1 for further understanding, wherein the similar reference numbers or symbols refer to the same elements in FIG. 2 and FIG. 1.

Specifically speaking, the error amplifying circuit 10 can comprise two comparators 100 and 102, and the error amplifying circuit 10 respectively feeds the ripple voltages generated by the first output voltage VOA and the second output voltage VOB to the comparators 100 and 102. Moreover, the comparators 100 and 102 respectively compare the ripple voltages with the first reference voltage Vref1 and the second reference voltage Vref2 all the time, so as to generate the first loading signal CP1 and the second loading signal CP2. The structure of the error amplifying circuit 10 is well-known for those skilled in the art, and thus the details of the error amplifying circuit 10 are omitted herein. According to the result output by the error amplifying circuit 10, the control circuit 14 can effectively determine which operation mode the SIDO power converter 1 is working in, such as the buck-boost operation mode, the boost operation mode and the inversing buck-boost operation mode.

In different operation modes, the loading conditions would not be all the same, which makes it hard to set the upper limit threshold and the lower limit threshold of the inductive current in different loading conditions. Thus, the switching of the turning on or off of the corresponding upper bridge transistor HS and/or the lower bridge transistor LS would be hard to operate. Therefore, the main feature of the instant disclosure is that, the detecting circuit 12 connected to the upper bridge transistor HS can effectively determine whether the inductive current reaches the upper limit threshold or the lower limit threshold, so as to make the control circuit 14 control the turning on or off of the corresponding upper bridge transistor HS and/or the lower bridge transistor LS, which can simplify the operation of the hysteresis current control mode.

For example, in this embodiment, when the SIDO power converter 1 is working in the inverting buck-boost operation mode, the SIDO converter 1 simultaneously outputs the first output voltage VOA and the second output voltage VOB respectively via the first output end OA and the second output end OB. Thus, the control circuit 14 determines how to simultaneously control the turning on or off of the upper bridge transistor HS and the lower bridge transistor LS according to the first control signal CS1 and the second control signal CS2.

Figure 3:
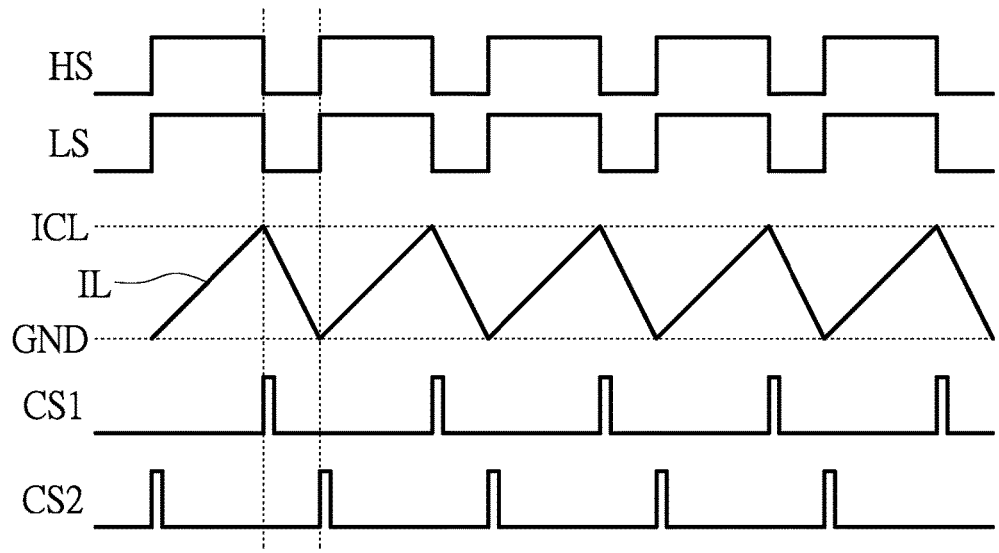
FIG. 3 shows a waveform diagram showing an operation of a SIDO power converter used in the hysteresis current control mode of one embodiment of the instant disclosure.

Specifically speaking, please refer to FIG. 3. FIG. 3 shows a waveform diagram showing an operation of a SIDO power converter used in the hysteresis current control mode of one embodiment of the instant disclosure. When the SIDO power converter 1 is working in the inverting buck-boost operation mode, if the upper bridge transistor HS and the lower bridge transistor LS are simultaneously turned on for making the inductive current IL increase continually, the detecting circuit 12 can obtain a detecting value related to the inductive current IL. If the detecting circuit 12 determines that the inductive current IL reaches to the upper limit threshold, such as ICL shown in FIG. 3, the detecting circuit 12 further outputs the first control signal CS1 at high level to make the control circuit 14 turn off the upper bridge transistor HS and the lower bridge transistor LS. On the other hand, if the detecting circuit 12 determines that the inductive current IL reaches to the lower limit threshold, such as the grounding voltage GND shown in FIG. 3, the detecting circuit 12 further outputs the second control signal CS2 at low level to make the control circuit 14 turn on the upper bridge transistor HS and the lower bridge transistor LS.

Figure 4:
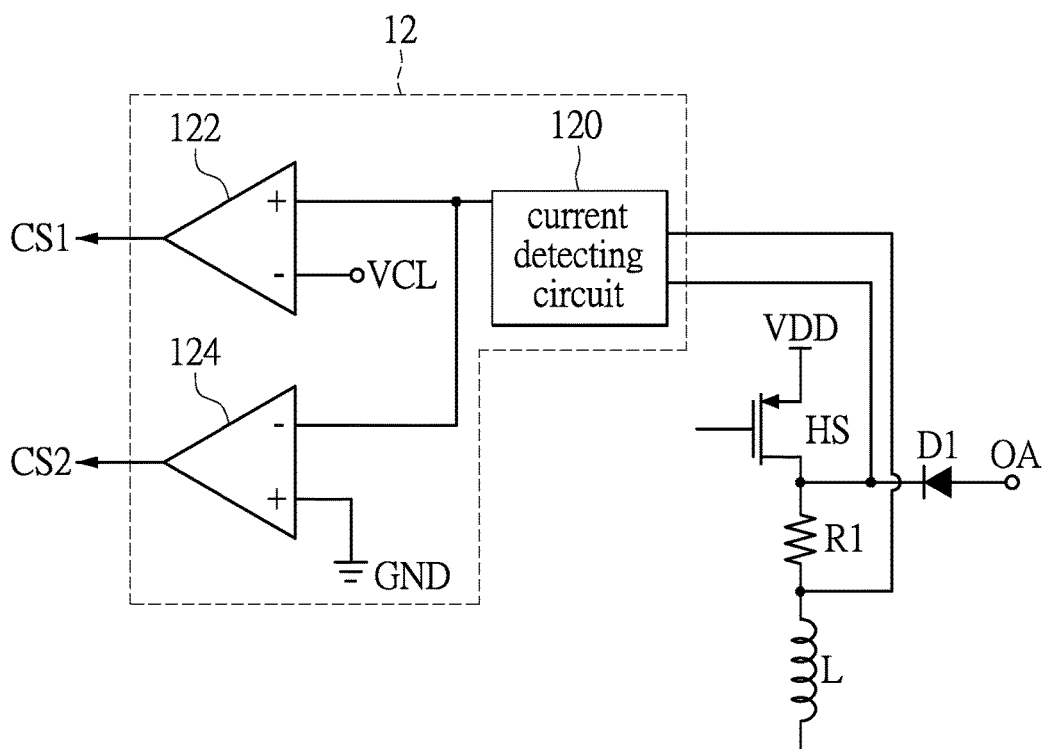
FIG. 4 shows a circuit diagram of a detecting circuit of a SIDO power converter used in the hysteresis current control mode of one embodiment of the instant disclosure.

Hence, according to the above, there should be several implementations of the detecting circuit 12. For example, please refer to FIG. 4. FIG. 4 shows a circuit diagram of a detecting circuit of a SIDO power converter used in the hysteresis current control mode of one embodiment of the instant disclosure. However, the following is one of implementations of the detecting circuit 12 of the SIDO power converter 1, but it is not limited herein. Furthermore, the detecting circuit 12 in this embodiment can be used in the SIDO converter 1 shown in FIG. 1, and thus please refer to FIG. 1 for further understanding, wherein the similar reference numbers or symbols refer to the same elements in FIG. 1.

Specifically, the SIDO power converter 1 can further comprise a first resistor R1, wherein the first resistor R1 has a first end and a second end and the first resistor R1 is connected between the drain of the upper bridge transistor HS and the inductor L. Therefore, the detecting circuit 12 could comprise a current detecting circuit 120, a first comparator 122 and a second comparator 124. The current detecting circuit 120 is connected to the first end and the second end of the first resistor R1, for sensing the voltage drop of the first resistor R1 as the detecting value related to the inductive current. The positive input end of the first comparator 122 receives the detecting value, and the negative input end of the first comparator 122 receives a setting voltage value VCL as the upper limit threshold. When the detecting value is larger than the setting voltage value VCL, the output end of the first comparator 122 outputs the first control signal CS1 at high level. In addition, the positive input end of the second comparator 124 receives the grounding voltage GND as the lower limit threshold, and the negative input end of the second comparator 124 receives the detecting value. When the grounding voltage GND is larger than the detecting value, the output end of the second comparator 124 outputs the second control signal CS2 at high level.

More precisely, under the situation that the inductive current keeps increasing, the drop voltage of the first resistor R1 would also continue to increase. Thus, when the drop voltage, the detecting value, reaches to the setting voltage value VCL, the inductive current may also reach to its upper limit threshold. Therefore, the output end of the first comparator 122 outputs the first control signal at high level to make the control circuit 14 turn off the upper bridge transistor HS and/or the lower bridge transistor LS corresponding to the current operation mode.

On the other hand, when the inductive current keeps decreasing, drop voltage of the first resistor R1 would also continue to decrease. Thus, when the drop voltage, the detecting value, reaches to the grounding voltage GND, the inductive current may also reach to its lower limit threshold. Therefore, the output end of the second comparator 124 outputs the second control signal at high level to make the control circuit 14 turn on the upper bridge transistor HS and/or the lower bridge transistor LS corresponding to the current operation mode. The above is for illustrating but not limiting the instant disclosure.

According to the embodiment shown in FIG. 4, the detecting circuit 12 of the instant disclosure can effectively sense the inductive currents of the power switch in different conditions. Also, the detecting circuit 12 can determine whether the inductive current reaches its upper and lower limit thresholds, and further output the corresponding signal to make the control circuit turn on or off the corresponding upper bridge transistor and/or lower bridge transistor, such that the operation under the hysteresis current control mode can be simplified.

Figure 5:
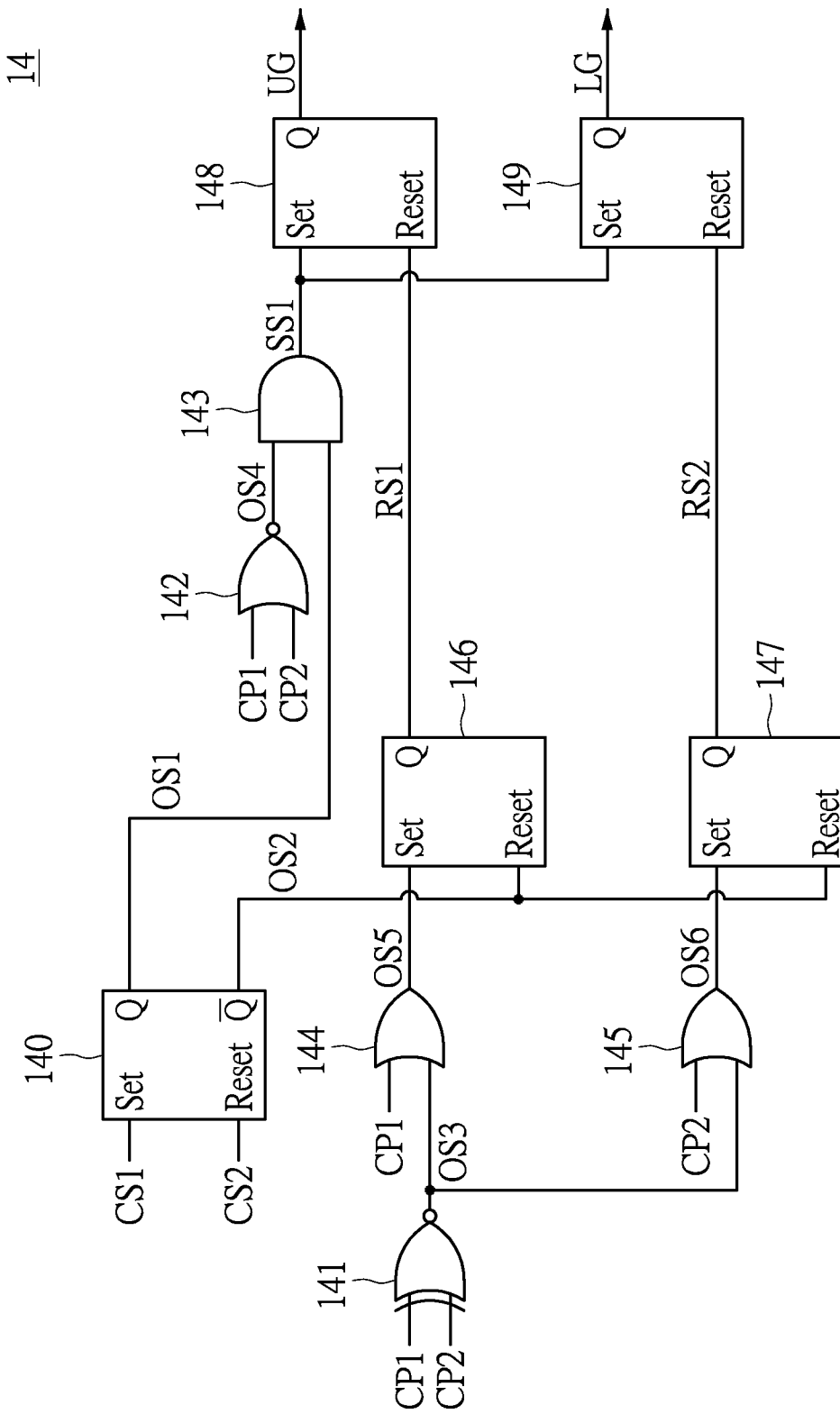
FIG. 5 shows a circuit diagram of a control circuit of a SIDO power converter used in the hysteresis current control mode of one embodiment of the instant disclosure.

In addition, to further illustrate the details of the control circuit 14 of the SIDO power converter 1, an embodiment of the control circuit 14 is provided. Please refer to FIG. 5. FIG. 5 shows a circuit diagram of a control circuit of a SIDO power converter used in the hysteresis current control mode of one embodiment of the instant disclosure. The following is one implementation of the control circuit 14 of the SIDO power converter 1, but it is not limited herein. Furthermore, the control circuit 14 in this embodiment can be used in the SIDO converter 1 shown in FIG. 1, and thus please refer to FIG. 1 and FIG. 4 for further understanding, wherein the similar reference numbers or symbols refer to the same elements in FIG. 1 and FIG. 4.

In detail, the control circuit 14 comprises a first flip flop 140, an EXCLUSIVE-NOR gate 141, a NOR gate 142, an AND gate 143, a first OR gate 144, a second OR gate 145 and the second to the fifth flip flop 146~149. The set end and the reset end of the first flip flop 140 respectively receive the first control signal CS1 and the second control signal CS2, and the positive output end and the negative output end of the first flip flop 140 respectively outputs the first output signal OS1 and the second output signal OS2. The EXCLUSIVE-NOR gate 141 respectively receives the first loading signal CP1 and the second loading signal CP2 and outputs the third output signal OS3. Moreover, the NOR gate 14 also respectively receives the first loading signal CP1 and the second loading signal CP2 and outputs the fourth output signal OS4. The AND gate 143 respectively receives the first output signal OS1 and the fourth output signal OS4, and outputs a setting signal SS1 via its output end.

On the other hand, the first OR gate 144 respectively receives the first loading signal CP1 and the third output signal, and outputs the fifth output signal OS5 via its output end. The second OR gate 145 respectively receives the second loading signal CP2 and the third output signal OS3, and outputs the sixth output signal OS6 via its output end. The set end and the reset end of the second flip flop 146 respectively receives the fifth output signal OS5 and the second output signal OS2, and the positive output end of the second flip flop 146 outputs the first reset signal RS1. The set end and the reset end of the third flip flop 147 respectively receive the sixth output signal OS6 and the second output signal OS2, and the positive output end of the third flip flop 147 outputs the second reset signal RS2. The set end and the reset end of the fourth flip flop 148 respectively receive the setting signal SS1 and the first reset signal RS1, and the positive output end of the fourth flip flop 148 outputs the first switch control signal UG to control the turning on or off of the upper bridge transistor HS. The set end and the reset end of the fifth flip flop 149 respectively receive the setting signal SS1 and the second reset signal RS2, and the positive output end of the fifth flip flop 149 outputs the second switch control signal LG to control the turning on or off of the lower bridge transistor LS.

According to the above, when the first comparator 122 outputs the first control signal CS1 at high level to the control circuit 14, the control circuit 14 outputs the first switch control signal UG and/or the second switch control signal LG at low level to the corresponding upper bridge transistor HS and/or lower bridge transistor LS in the current operation mode, so as to turn off the corresponding upper bridge transistor HS and/or lower bridge transistor LS. On the other hand, when the second comparator 124 outputs the second control signal CS2 at high level to the control circuit 14, the control circuit 14 outputs the first switch control signal UG and/or the second switch control signal LG at high level to the corresponding upper bridge transistor HS and/or lower bridge transistor LS in the current operation mode, so as to turn on the corresponding upper bridge transistor HS and/or lower bridge transistor LS.

It is worth mentioning that, the structures of the first flip flop 140, the EXCLUSIVE-NOR gate 141, the NOR gate 142, the AND gate 143, the first OR gate 144, the second OR gate 145 and the second to the fifth flip flops 146~149 of the control circuit 14 are well known to those skilled in the art, and thus there will be no description regarding the details of the first flip flop 140, the EXCLUSIVE-NOR gate 141, the NOR gate 142, the AND gate 143, the first OR gate 144, the second OR gate 145 and the second to the fifth flip flops 146~149. The above is for illustrating but not limiting the instant disclosure.

Additionally, as described above, the detecting circuit 12 can effectively sense the inductive currents of the power switch in different conditions. Thus, every possible condition where the upper bridge transistor HS and the lower bridge transistor LS are turned on or off would be understood by those skilled in the art. For instance, when the upper bridge transistor HS and the lower bridge transistor LS are both turned on, the SIDO power converter 1 is charging the inductor. In addition, when the upper bridge transistor HS is turned on but the lower bridge transistor LS is turned off, the SIDO power converter 1 is discharging to the inductor L in the buck-boost operation mode. In other words, the first output end OA of the SIDO power converter 1 outputs the first output voltage VOA. When the upper bridge transistor HS and the lower bridge transistor LS are both turned off, the SIDO power converter 1 is discharging to the inductor L in the inversing buck-boost operation mode.

Figure 6:
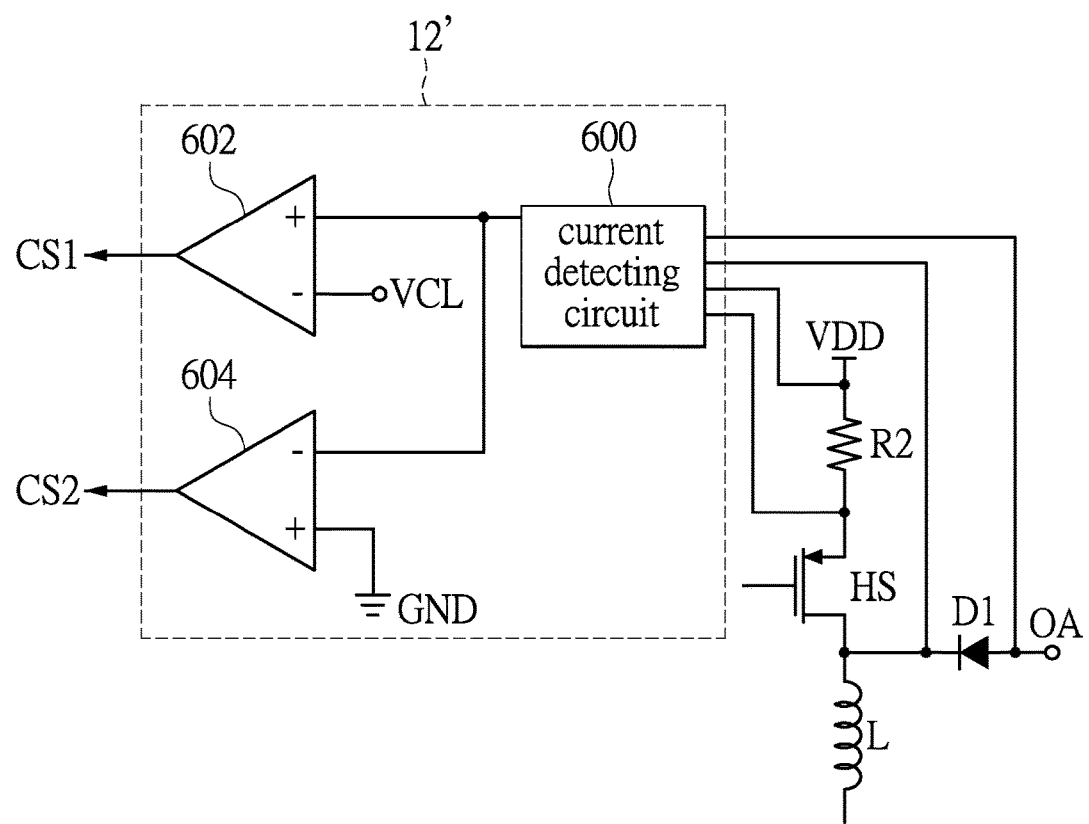
FIG. 6 shows a circuit diagram of a detecting circuit of a SIDO power converter used in the hysteresis current control mode of another embodiment of the instant disclosure.

Moreover, another embodiment of the detecting circuit 12 is provided. For example, please refer to FIG. 6. FIG. 6 shows a circuit diagram of a detecting circuit of a SIDO power converter used in the hysteresis current control mode of another embodiment of the instant disclosure. However, the following is one implementation of a detecting circuit 12' of the SIDO power converter 1, but it is not limited herein. Furthermore, the detecting circuit 12' in this embodiment can be used in the SIDO converter 1 shown in FIG. 1, and thus please refer to FIG. 1 for further understanding, wherein the similar reference numbers or symbols refer to the same elements in FIG. 1.

In detail, the SIDO power converter 1 further comprises a second resistor R2, wherein the second resistor R2 has a first end and a second end and the second resistor R2 is connected between the source of the upper bridge transistor HS and the input voltage. Thus, the detecting circuit 12' can comprise a current detecting circuit 600, a first comparator 602 and a second comparator 604. The first end and the second end of the second resistor R2 are respectively connected to the current detecting circuit 600, and also the two ends of the first diode D1 are respectively connected to the current detecting circuit 600. When the upper bridge transistor HS is turned on, the current detecting circuit 600 senses the drop voltage of the second resistor R2 as the detecting value. When the upper bridge transistor HS is turned off and the lower bridge transistor LS is turned on, the current detecting circuit 600 senses the drop voltage of the first diode D1 as the detecting value.

In addition, the positive input end and the negative input end of the first comparator 602 respectively receive the detecting value and a setting voltage value. When the detecting value is larger than the setting voltage value, the output end of the first comparator 602 outputs the first control signal CS1 at high level. The positive input end and the negative input end of the second comparator 604 respectively receive the grounding voltage GND and the detecting value. When the grounding voltage GND is larger than the detecting value, the output end of the second comparator 604 outputs the second control signal CS2 at high level.

From the above it is known that the difference between FIG. 4 and FIG. 6 is, according to different discharging paths of the inductor L, the drop voltages at different electric elements (such as the second resistor R2 or the first diode D1) are sensed as the detecting value in the embodiment shown in FIG. 6. The detecting value is used to determine whether the inductive current reaches to the lower limit threshold, and accordingly the control circuit 14 turns on the corresponding upper bridge transistor HS and/or lower bridge transistor LS. The embodiment shown in FIG. 6 is for illustrating but not limiting the instant disclosure, and those skilled in the art can design the detecting circuit depending on need.

Figure 7:
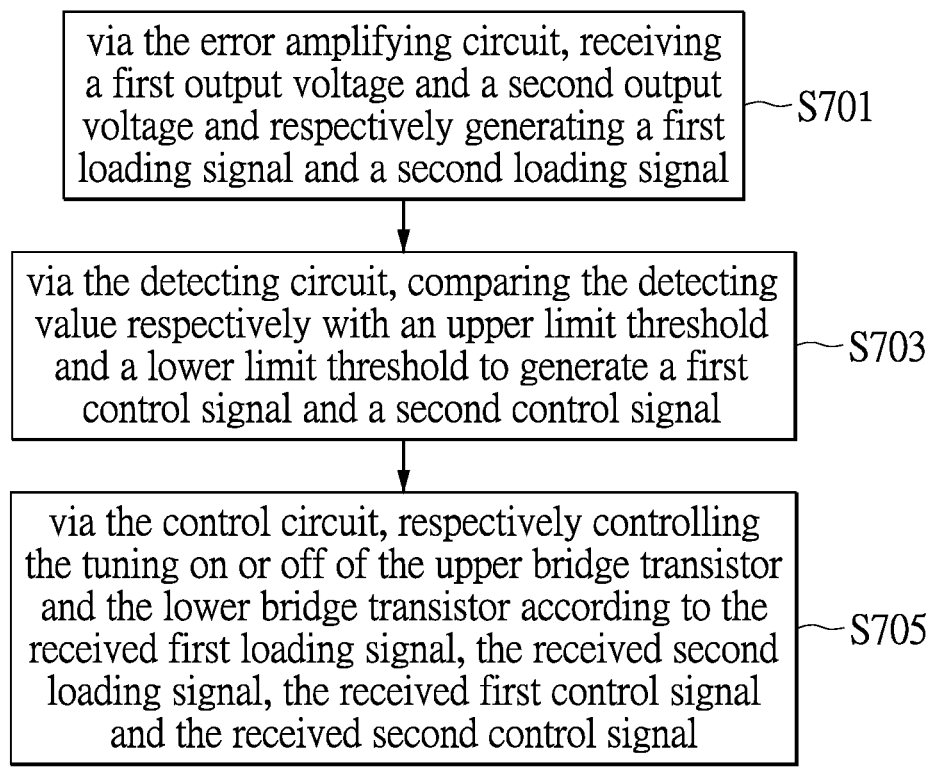
FIG. 7 shows a flow chart of a method to control a SIDO power converter used in the hysteresis current control mode of one embodiment of the instant disclosure.

Moreover, in order to further illustrate the operation process of the control method of the SIDO power converter used in the hysteresis current control mode, there is an embodiment provided. Please refer to FIG. 7. FIG. 7 shows a flow chart of a method to control a SIDO power converter used in the hysteresis current control mode of one embodiment of the instant disclosure. The control method in this embodiment can be used in the SIDO converter 1 shown in FIG. 1, and thus please refer to FIG. 1 for further understanding.

In Step S701, via the error amplifying circuit, comparing the received first output voltage and the second output voltage respectively with the first reference voltage and the second reference voltage, so as to generate the first loading signal and the second loading signal. In Step S703, via the detecting circuit, comparing the obtained detecting value respectively with the upper limit threshold and the lower limit threshold, so as to generate the first control signal and the second control signal. Finally, in Step S705, via the control circuit, respectively controlling the turning on or off of the upper bridge transistor and the lower bridge transistor according to the received first loading signal, second loading signal, first control signal and the second control signal.

Specifically speaking, via the embodiments of the detecting circuit shown in FIG. 4 and FIG. 6, the inductive currents of the power switch in different conditions can be effectively detected. After that, via some logic elements, whether the detected inductive currents reach the upper limit threshold or the lower limit threshold can be determined, so as to output each control signal to make the control circuit turn on or off the corresponding upper bridge transistor and/or the lower bridge transistor. Thereby, the operation of the hysteresis current control mode can be simplified.

To sum up, in the SIDO power converter used in the hysteresis current control mode and the control method thereof provided by the instant disclosure, the detecting circuit, connected to the upper bridge transistor, determines whether the inductive current reaches the upper limit threshold or the lower limit threshold, and further drives the control circuit to turn on or off the corresponding upper bridge transistor and/or the lower bridge transistor, so as to simplify the operation of the hysteresis current control mode.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A Single-Inductor Dual-Output (SIDO) power converter used in a Hysteresis Current Control Mode, comprising:

an upper bridge transistor, connected between a first output end and an input voltage;

a lower bridge transistor, connected between a second output end and a grounding voltage; and an inductor, connected between the first output end and the second output end;

an error amplifying circuit, connected to the first output end and the second output end and configured to receive a first output voltage and a second output voltage and to respectively compare the received first output voltage and the received second output voltage with a first reference voltage and a second reference voltage, so as to generate a first loading signal and a second loading signal;

a detecting circuit, connected to the upper bridge transistor and configured to receive a detecting value and compare the detecting value respectively with an upper limit threshold and a lower limit threshold, so as to generate a first control signal and a second control signal; and a control circuit, connected to the error amplifying circuit and the detecting circuit and configured to receive the first loading signal, the second loading signal, the first control signal and the second control signal, and to respectively control a tuning on or off of the upper bridge transistor and the lower bridge transistor according to the received first loading signal, the received second loading signal, the received first control signal and the received second control signal;

wherein the control circuit comprises:

a first flip flop, configured to receive the first control signal and the second control signal respectively via its set end and its reset end, and to output a first output signal and a second output signal respectively via its positive input end and its negative input end;

an EXCLUSIVE-NOR gate, configured to receive the first loading signal and the second loading signal respectively via its two input ends, and to output a third output signal via its output end;

a NOR gate, configured to receive the first loading signal and the second loading signal via its two input ends, and to output a fourth output signal via its output end;

an AND gate, configured to receive the first output signal and the fourth output signal respectively via its two input ends, and to output a setting signal via its output end;

a first OR gate, configured to receive the first loading signal and the third output signal respectively via its two input ends, and to output a fifth output signal via its output end;

a second OR gate, configured to receive the second loading signal and the third output signal respectively via its two input ends, and to output a sixth output signal via its output end;

a second flip flop, configured to receive the fifth output signal and the second output signal respectively via its set end and its reset end, and to output a first reset signal via its positive output end;

a third flip flop, configured to receive the sixth output signal and the second output signal respectively via its set end and its reset end, and to output a second reset signal via its positive output end;

a fourth flip flop, configured to receive the setting signal and the first reset signal respectively via its set end and its reset end, and to output a first switch control signal via its positive output end to turn on or off the upper bridge transistor; and a fifth flip flop, configured to receive the setting signal and the second reset signal respectively via its set end and its reset end, and to output a second switch control signal via its positive output end to turn on or off the lower bridge transistor.

2. The SIDO power converter according to claim 1, wherein the upper bridge transistor is a P-channel MOSFET, the lower bridge transistor is an N-channel MOSFET, and the inductor is connected between the drain of the upper bridge transistor and the drain of the lower bridge transistor.

3. The SIDO power converter according to claim 2, further comprising a first resistor having a first end and a second end, and the first resistor is connected between the drain of the upper bridge transistor and the inductor.

4. The SIDO power converter according to claim 3, wherein the detecting circuit comprises:
a current detecting circuit, connected between the first end and the second end of the first resistor, and configured to detect a drop voltage of the first resistor as the detecting value;
a first comparator, configured to receive the detecting value and a setting voltage value respectively via a positive input end and a negative input end of the first comparator, and to output the first control signal at high level via its output end if the detecting value is larger than the setting voltage value; and
a second comparator, configured to receive the grounding voltage and the detecting value respectively via a positive input end and a negative input end of the second comparator, and to output the second control signal at high level via its output end if the grounding voltage is larger than the detecting value.

5. The SIDO power converter according to claim 2, further comprising:
a first diode, connected between the drain of the upper bridge transistor and the first output end;
a second diode, connected between the drain of the lower bridge transistor and the second output end;
a first output capacitor, connected between the first output end and the grounding voltage; and
a second output capacitor, connected between the second output end and the grounding voltage.

6. The SIDO power converter according to claim 5, further comprising:
a second resistor, having a first end and a second end, connected between the source of the upper bridge transistor and the input voltage.

7. The SIDO power converter according to claim 6, wherein the detecting circuit comprises:
a current detecting circuit, respectively connected to the first end and the second end of the second resistor and two ends of the first diode, wherein the current detecting circuit detects a drop voltage of the second resistor as the detecting value when the upper bridge transistor is turned on, and the current detecting circuit detects the drop voltage of the first diode as the detecting value when the upper bridge transistor is turned off and the lower bridge transistor is turned on;
a first comparator, configured to receive the detecting value and a setting voltage value respectively via its positive input end and its negative input end, and to output the first control signal at high level if the detecting value is larger than the setting voltage value; and
a second comparator, configured to receive the grounding voltage and the detecting value via its positive input end and its negative input end, and to output the second control signal at high level if the grounding voltage is larger than the detecting value.

8. A method to control a Single-Inductor Dual-Output (SIDO) power converter used in a Hysteresis Current Control Mode, wherein the SIDO power converter comprises an upper bridge transistor connected between a first output end and an input voltage, a lower bridge transistor connected between a second output end and a grounding voltage, an inductor connected between the first output end and the second output end, an error amplifying circuit connected to the first output end and the second output end, a detecting circuit connected to the upper bridge transistor, and a control circuit connected to the error amplifying circuit and the detecting circuit, the method comprising:
via the error amplifying circuit, receiving a first output voltage and a second output voltage and respectively comparing the received first output voltage and the received second output voltage with a first reference voltage and a second reference voltage, so as to generate a first loading signal and a second loading signal;
via the detecting circuit, receiving a detecting value and comparing the detecting value respectively with an upper limit threshold and a lower limit threshold, so as to generate a first control signal and a second control signal; and
via the control circuit, receiving the first loading signal, the second loading signal, the first control signal and the second control signal, and respectively controlling a tuning on or off of the upper bridge transistor and the lower bridge transistor according to the received first loading signal, the received second loading signal, the received first control signal and the received second control signal;
wherein the control circuit comprises:
a first flip flop, configured to receive the first control signal and the second control signal respectively via its set end and its reset end, and to output a first output signal and a second output signal respectively via its positive input end and its negative input end;
an EXCLUSIVE-NOR gate, configured to receive the first loading signal and the second loading signal respectively via its two input ends, and to output a third output signal via its output end;
a NOR gate, configured to receive the first loading signal and the second loading signal via its two input ends, and to output a fourth output signal via its output end;
an AND gate, configured to receive the first output signal and the fourth output signal respectively via its two input ends, and to output a setting signal via its output end;
a first OR gate, configured to receive the first loading signal and the third output signal respectively via its two input ends, and to output a fifth output signal via its output end;
a second OR gate, configured to receive the second loading signal and the third output signal respectively via its two input ends, and to output a sixth output signal via its output end;
a second flip flop, configured to receive the fifth output signal and the second output signal respectively via its set end and its reset end, and to output a first reset signal via its positive output end;
a third flip flop, configured to receive the sixth output signal and the second output signal respectively via its set end and its reset end, and to output a second reset signal via its positive output end;

a fourth flip flop, configured to receive the setting signal and the first reset signal respectively via its set end and its reset end, and to output a first switch control signal via its positive output end to turn on or off the upper bridge transistor; and a fifth flip flop, configured to receive the setting signal and the second reset signal respectively via its set end and its reset end, and to output a second switch control signal via its positive output end to turn on or off the lower bridge transistor.

9. The method according to claim 8, wherein the upper bridge transistor is a P-channel MOSFET, the lower bridge transistor is a N-channel MOSFET, and the inductor is connected between the drain of the upper bridge transistor and the drain of the lower bridge transistor.

10. The method according to claim 9, wherein the SIDO power converter further comprises:

a first resistor having a first end and a second end, and the first resistor is connected between the drain of the upper bridge transistor and the inductor.

11. The method according to claim 10, wherein the detecting circuit comprises:

a current detecting circuit, connected between the first end and the second end of the first resistor, and configured to detect a drop voltage of the first resistor as the detecting value;

a first comparator, configured to receive the detecting value and a setting voltage value respectively via a positive input end and a negative input end of the first comparator, and to output the first control signal at high level via its output end if the detecting value is larger than the setting voltage value; and a second comparator, configured to receive the grounding voltage and the detecting value respectively via a positive input end and a negative input end of the second comparator, and to output the second control signal at high level via its output end if the grounding voltage is larger than the detecting value.

12. The method according to claim 9, wherein the SIDO power converter further comprises:

a first diode, connected between the drain of the upper bridge transistor and the first output end;

a second diode, connected between the drain of the lower bridge transistor and the second output end;

a first output capacitor, connected between the first output end and the grounding voltage; and a second output capacitor, connected between the second output end and the grounding voltage.

13. The method according to claim 12, wherein the SIDO power converter further comprises:

a second resistor, having a first end and a second end, connected between the source of the upper bridge transistor and the input voltage.

14. The method according to claim 13, wherein the detecting circuit comprises:

a current detecting circuit, respectively connected to the first end and the second end of the second resistor and two ends of the first diode, wherein the current detecting circuit detects a drop voltage of the second resistor as the detecting value when the upper bridge transistor is turned on, and the current detecting circuit detects the drop voltage of the first diode as the detecting value when the upper bridge transistor is turned off and the lower bridge transistor is turned on;

a first comparator, configured to receive the detecting value and a setting voltage value respectively via its positive input end and its negative input end, and to output the first control signal at high level if the detecting value is larger than the setting voltage value; and a second comparator, configured to receive the grounding voltage and the detecting value via its positive input end and its negative input end, and to output the second control signal at high level if the grounding voltage is larger than the detecting value.

* * * * *